Sept. 17, 1940.    G. O. GABRIEL    2,215,369
METAL WORKING MACHINE AND METHOD
Filed Feb. 28, 1938    5 Sheets-Sheet 3

Gustave O. Gabriel—INVENTOR
BY Francis J. Klempay
ATTORNEY

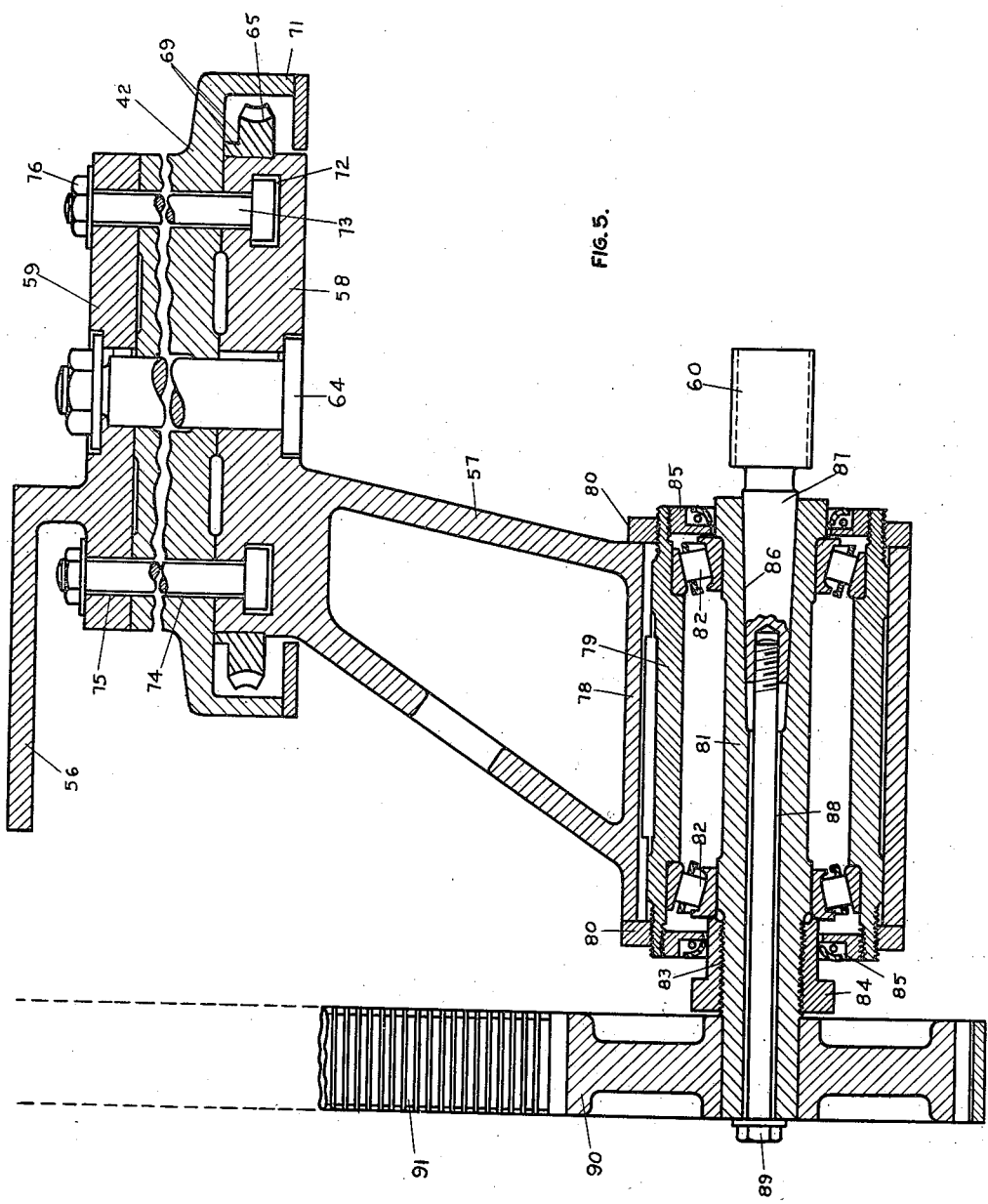

Sept. 17, 1940.  G. O. GABRIEL  2,215,369
METAL WORKING MACHINE AND METHOD
Filed Feb. 28, 1938   5 Sheets-Sheet 5

Gustave O. Gabriel INVENTOR.

BY Francis J. Klempay
ATTORNEY

Patented Sept. 17, 1940

2,215,369

UNITED STATES PATENT OFFICE 2,215,369

METAL WORKING MACHINE AND METHOD

Gustave O. Gabriel, Warren, Ohio, assignor to Taylor-Winfield Corporation, Warren, Ohio, a corporation of Ohio Application February 28, 1938, Serial No. 193,194

23 Claims. (Cl. 29—26)

This invention relates to the metal working art and more particularly to method and apparatus for the preparation of metal elements prior to their fabrication into structures by the use of high production methods. The principal service performed by the machine of the invention is the simultaneous and accurate milling of the ends of tubes, rods, or other lengths of metal which are to be connected at their ends with other lengths of metal tubes, rods or other shapes in making up the structures, the machine being provided with novel means for carrying the cutting tools whereby an infinite number of end surfaces may be provided on the various elements being worked on. The machine is essentially a high production machine for the specific purpose indicated and is characterized by the facility with which adjustments may be made to produce different end surfaces and by the fact that once set up it is semi-automatic in its operation and does not require the constant attendance of a particularly skilled person.

In the production of certain structures fabricated from tubular elements, such as bicycle frames, for example, electrical resistance welding to connect the tubes together is sometimes used and it is now possible to form the welds without the formation of exterior burrs or excess spattered metal which ordinarily must be removed at considerable cost. For example, a process, as disclosed in U. S. Patent No. 2,091,982 depends, for its successful execution, upon the formation of peculiar end surfaces on the tubes which are to be end welded to another running tube or other member. It is necessary that the end of the tube be milled in such manner that it presents a continuous line contact, coincident with the inner cylindrical surface of the tube, with the surface of the running tube. The end line of the outer cylindrical surface of the tube is uniformly spaced from the surface of the running tube to provide a wedge-shaped void or which is closed up during the welding operation due to the melting of the metal about the original line contact.

Inasmuch as certain of the tubes forming the structures are connected with other tubes or elements of various diameters at both ends thereof and make various angles with such other tubes or elements, the difficulty of properly milling the ends of the tubes so that the milled surfaces are accurate in themselves and bear an accurate relation to each other so that they will properly fit in the assembled structure should be apparent. The milled end surface must bear a proper relation to the tube itself and to the milled other end and the distance between the two must be controlled. By the use of my machine, which employs a pair of spaced compound angularly adjustable milling cutters for simultaneous operation on both ends of the tube, these various factors are inherently controlled once the machine is properly set up for a particular operation.

Since it is necessary that the line contact above mentioned must be maintained during the application of the welding pressure and current, it is highly desirable to provide an aperture or other indexing means on the tube adjacent the milled end thereof to cooperate with a pin or other means fixed on the assembling jig or clamping electrodes of the welding machine for the purpose of aligning and orienting the milled tube in relation to the element to which it is to be welded. This is accomplished, according to my method, by providing drills on the machine, fixed in relation to the tube clamping means, the purpose of which is to drill the apertures in the tube simultaneously with the milling of the ends of the tubes so that once the machine is properly set up the apertures must necessarily be properly positioned with respect to the milled end surfaces of the tube. In accordance with usual practice the milling cutters are fed automatically and adjustable means limiting the extent of feed are provided.

Accordingly, the primary object of the invention is to provide a machine which will simultaneously mill both ends of a tube at a single setting of the tube, the milled surfaces being of a wide variety of shapes and angular dispositions.

Another object of the invention is to provide a machine which will simultaneously mill both ends of a tube and drill indexing apertures in said tube in a predetermined relation to the surfaces milled.

A further object of the invention is to provide means in a milling machine whereby the rotating cutter may be adjusted about a plurality of intersecting axes, the intersection being coincident with the geometrical center of the milling cutter, whereby the design of the cutter and the adjustment of the machine is simplified.

A still further object of the invention is to provide a machine for simultaneously milling both ends of a tube in which the milling cutters are each adjustable about a plurality of intersecting axes, the axes intersecting at the geometrical center of the milling cutter, and the points of intersection being movable substantially along the center line of the tube irrespective of the curvature of the tube.

These and other objects and advantages of the invention will become apparent from a consideration of the drawings and the following detailed specification.

In the drawings:

Figure 5 is an enlarged sectional view of a cutter spindle carrier;

Figure 1:
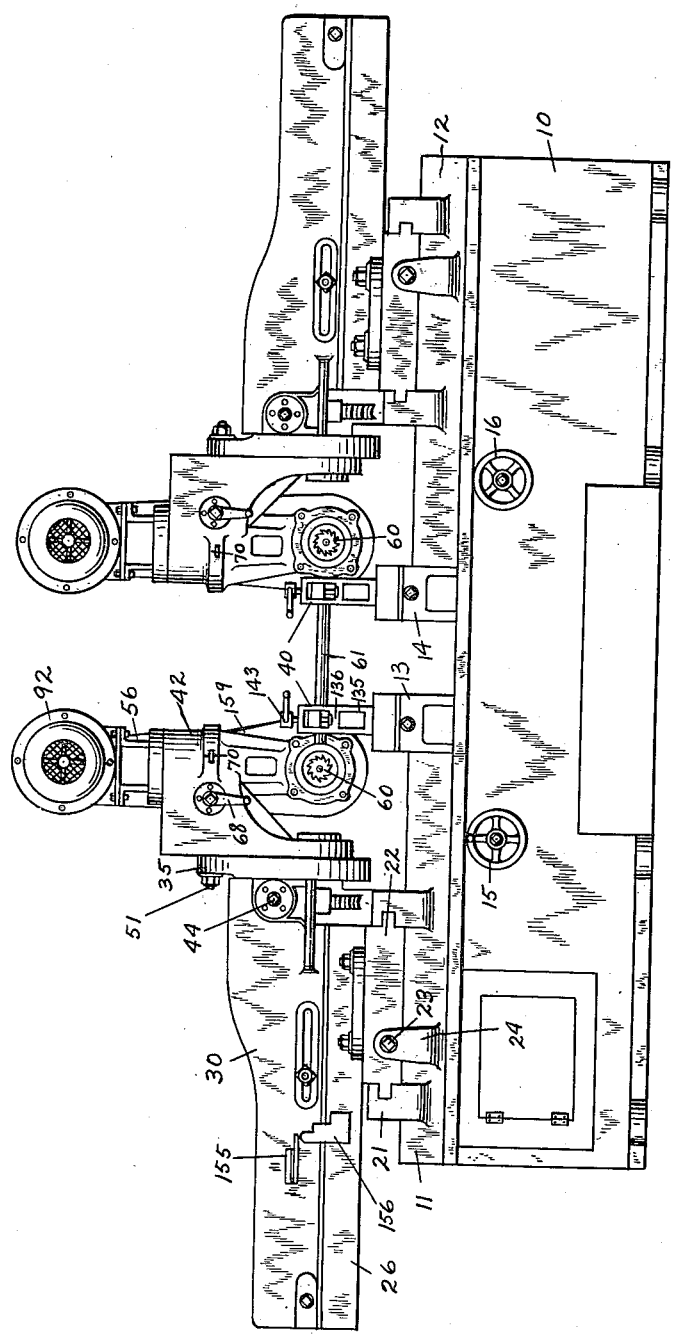
Figure 1 is a front view of the assembled machine showing the relationship of the parts.

Referring to Figure 1 of the drawings, the machine consists, generally, of a base 10, a pair of tube clamping means generally indicated at 40 and a pair of adjustable milling cutters 60 positioned outside of the clamps 40 and adapted to engage and simultaneously mill the ends of the tube 61 held in the clamps. An automatically operable drill, to be later described, is mounted within and below each of the clamps 40 to drill indexing apertures in the tube in fixed predetermined relation to the milled surfaces.

Longitudinally slidable on the base 10 are the supports 11 and 12 having integral or attached tube clamp and drill supporting frames 13 and 14, respectively, and movable along the base by rotation of the hand wheels 15 and 16, respectively, each of which are coupled with a spur gear 18, meshing with a rack bar 19 attached to the supports. (See Figure 2.) Inasmuch as the machine is symmetrical—the right half being identical with the left half, except reversed, but one half of the machine will be described in detail.

Transversely slidable in the guides 21, which are carried with support 11, is the block 22 adapted to support one complete milling unit. Block 22 is movable transversely by rotation of the screw 23 fixed axially with respect to the lug 24 on support 11 and which is screw threadedly engaged with a portion of the block. Rotatably mounted on the block 22 is the slide support 26, the center bolt 27 providing the pivot and the peripheral bolts 28 being received within arcuate slots in the slide support. A hollow slide member 30 having a transverse strut 31 is mounted on support 26 and is adapted to be moved longitudinally of the support by the hydraulic cylinder 32 fixed in relation to the support and having its piston adjustably connected with the strut 31 by the rod 33. The end of the slide 30 opposite the strut and cylinder is provided with an integral downwardly extending vertical face 35 and a downwardly opening recess 36 between a portion of the face and the main body of the slide. The lower portion of the face 35 is provided with a large bore 38 for the passage of a large supporting and rotating sleeve 39 which is adapted to rotate and provide a pivot for the bracket 42. Keyed and fastened to one end of the sleeve 39 and housed partially within the recess above mentioned is the worm wheel 43 adapted to be engaged and driven by the transversely disposed worm 44 carried by a transverse shaft having a squared end 44' extending outwardly beyond the outer surface of the slide 30 where it may be engaged by a crank or tool. The opposite end of sleeve 39 is keyed within a bore 45 in the lower vertical portion of bracket 42 and is provided with a threaded boss 46 on which is screw threaded a ring 47 to clamp the face 35 and bracket together. The bracket is further clamped to the face by the bolts 48 having their heads 49 slidably received in the arcuately disposed T-shaped slot 50 and by a bolt 51 screw-threadedly engaged with the bracket and passing through an arcuately disposed slot 52. When bolts 48 and 51 are loosened, rotation of the worm carrying shaft will result in pivotal movement of the bracket 42 about the horizontally disposed axis of sleeve 39. If desired a suitable scale may be placed on an exposed arcuate portion of the bracket and a cooperating fixed pointer or mark on the face 35 to precisely indicate the degree of turning or cant of the bracket.

Figure 2:
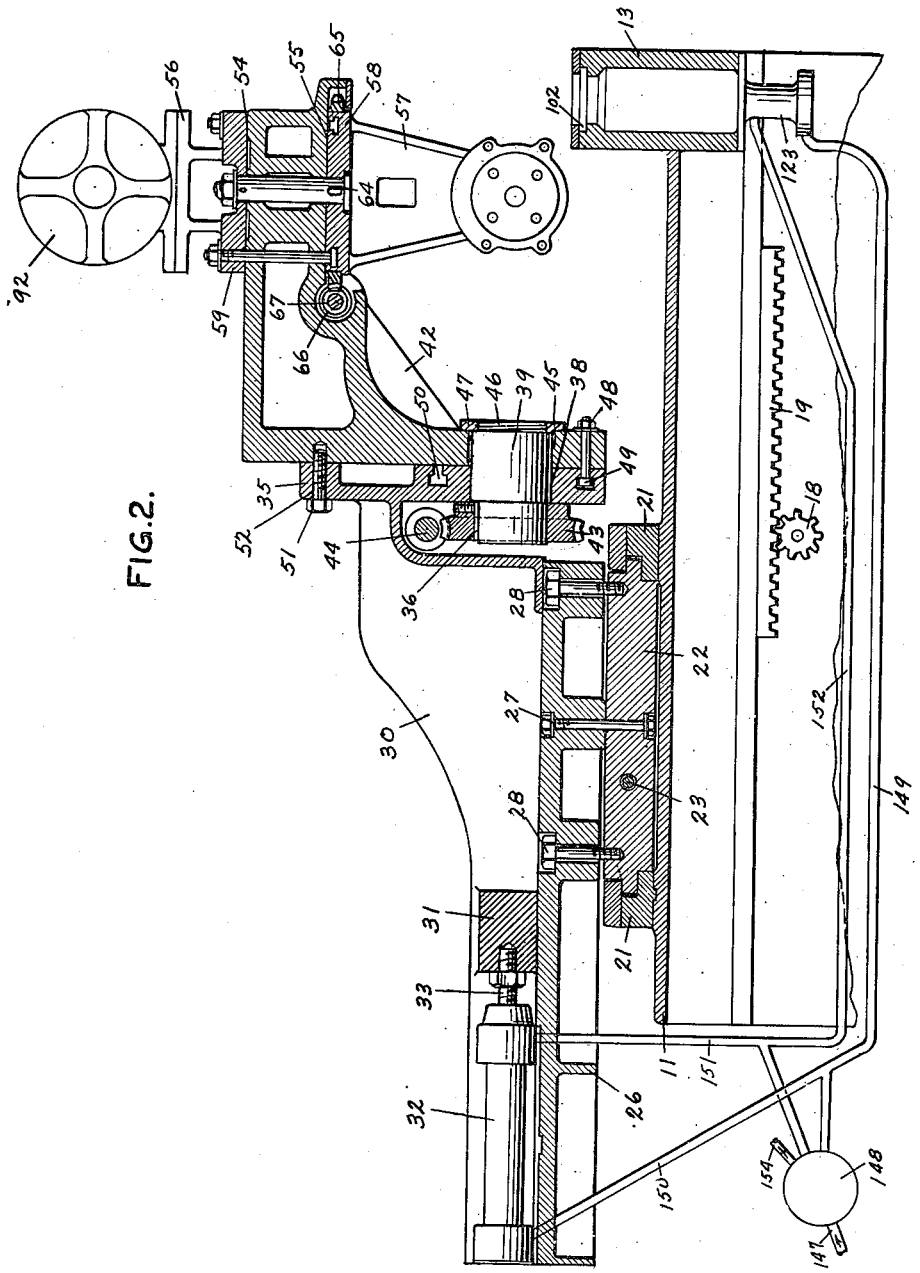
Figure 2 is a longitudinal sectional view of a portion of the machine.

The outer end of the horizontal portion of the bracket 42 is provided with parallel machined upper and lower surfaces, 54 and 55, respectively, to provide bearing surfaces for the rotatable motor support 56 and the milling cutter spindle supporting bracket 57. As shown in Figure 2 and more clearly in Figure 5, the spindle supporting bracket is provided with an upper horizontally disposed disk-like portion 58 the upper surface of which is machined to engage the machined surface 55 of the bracket. The motor supporting bracket 56 is provided with a lower disk-like portion 59 to overlie the surface 54 of bracket 42. Disks 59, bracket 42 and disk 58 are provided with aligned centrally disposed bores for the passage of the pivot bolt 64 which is keyed to the disks 59 and 58, as shown, but which is free to rotate with respect to the bracket 42. The motor supporting bracket 56 and the spindle support 57 must therefore move in unison and to facilitate the angular adjustment of this assembly, a worm wheel 65 is secured to the outer periphery of the disk 58 and is adapted to be engaged and rotated by the transversely disposed worm 66 mounted on shaft 67 which is carried by bracket 42 and extends outwardly beyond the outer surface of the bracket for engagement with a crank 68 or other tool. Worm wheel 65 may be provided with an upwardly extending flange 69 on the peripheral surface of which is inscribed a scale which cooperates with a line mark adjacent a window 70 in the downwardly extending flange 71 to indicate precisely the extent of angular adjustment of the spindle carrier. The flange 71 may be made integral with the bracket 42 and its purpose is to house and protect the worm wheel 65. To rigidly clamp the motor and spindle supports in adjusted position on the bracket, the disk 58 is provided with an arcuately disposed T-shaped slot 72 to slidably receive the heads of the radially positioned bolts 73 which pass through bores 74 of the bracket and arcuate slots 75 of motor bracket. The nuts 76 are positioned on top of the assembly where they are readily available. The arrangement is such that it allows the interconnected motor and spindle supports to rotate relative to bracket 42.

The milling cutter spindle support proper is offset with respect to the disk portion 58 and comprises a horizontally disposed hub 78 in which is adjustably and non-rotatably mounted the bearing sleeve 79. As shown in Figure 5, the sleeve 79 is both interiorly and exteriorly threaded at its ends and the interiorly threaded rings 80 are adapted to be screw-threaded on the ends of sleeve 79 and to engage the ends of hub 78 to securely clamp the sleeve 79 in adjusted position within the hub. The cutter carrying spindle 81 is journaled within the sleeve 79 on suitable anti-friction bearings 82, the spindle being provided with a threaded portion 83 on which is screw threaded the collar 84 to provide for bearing adjustment. Oil retaining assemblies 85 are screw threaded into the ends of the sleeve 79 to complete the assembly. Spindle 81 is provided with a tapered bore 86 to receive the tapered stock 87 of the milling cutter 60 and with a straight bore 88 in general continuation of the tapered bore 86 to allow for passage of the draw bolt 89. A gear 90 is keyed to the end of spindle 81 opposite cutter 60 and is adapted to be driven by a chain 91 coupled with a gear (not shown) on the shaft of motor 92 or a combined motor and speed reducer secured on the offset motor support 56. As shown, the plane of the spindle driving gears and chain is considerably removed from any portion of the bracket 42 and this arrangement enables the milling cutter to be adjusted a large number of degrees about the vertical axis of the pivot bolt 64. The offset character of the spindle support 57 enables the cutter 60 to be so positioned that the vertical axis of rotation of the support passes through its geometrical center. Likewise, the depending nature of the support enables the center of the cutter to be positioned in a line coincident with the horizontal axis of rotation of the bracket 42, i. e., rotation about sleeve 39.

The tube clamping and drilling assembly is slidably mounted in the frame 13 on the plate 101, the laterally extending flanges of which are adapted to be received in the guiding grooves 102 of the frame. Any suitable means may be employed to move the plate 101 in the frame and to lock the plate in adjusted position. A bore 103 is provided in the plate 101 adjacent one end thereof in which is swivably mounted a bushing 104 having a radially extending flange 114 to overlie a portion of the plate 101 and to provide means for attachment of the lower flanged end of the tube support 105. Flange 114 projects beyond the periphery of the flange of the tube support 105 and is provided in the projecting portion with arcuately disposed slots 106 for the passage of clamping bolts, if desired. Also, if desired, a scale may be placed on the peripheral surface of flange 114 to cooperate with a fixed mark or pointer on the plate 101 to indicate the degree of angular adjustment of the tube clamp. In this connection it is desired to point out that the purpose of having the tube clamp both laterally and angularly adjustable is to accommodate tubes having different positions and degrees of bends. Inasmuch as the ends of the tubes must be milled with accuracy so that the milled ends will bear a predetermined relation to the adjacent portions of the tubes and to each other it is desirable to bend the tubes to their proper shapes before milling them.

Tube support 105 is provided with a semi-cylindrical surface 108 at its upper end, a transverse bore 109, an axial bore 110 between the transverse bore and the upper end, and a larger axial bore 111 between the transverse bore and the lower end. A drill guide 112 is positioned in bore 110 and a drill carrying spindle 113 is adapted to be rotatably received in the larger bore 111. A spindle bushing 115 is received within the bushing 104 immediately below the member 105 and is held in position by the internal shoulder 116 of member 104. Positioned in the upper end of bore 111 immediately below the transverse bore 109 is the chip disk 117, the purpose of which is to break up the cut out material passed down by the drill 118 so that this material may pass out through bore 109 and be prevented from passing downward into the spindle bearings and support.

Spindle 113 is rotatably supported on anti-friction bearings 120 encased in a slide 121 which in turn is housed in the tubular member 122 depending from and secured to the slidable plate 101 and concentrically arranged with respect to the bore 103. To the lower end of housing 122 is attached an hydraulic cylinder 123 having an operating piston 124 connected with the slide 121 by means of a rod 125. Fluid pressure in the cylinder below the piston results in upward movement of the slide 121, spindle 113 and drill 118 for the purpose of feeding the drill into the tube. To prevent rotation of the slide 121 and to limit the extent of its axial movement, a slot 126 is provided in its side wall in which extends a lug 127 fixed in relation to housing 122. Spindle 113 is driven by a motor 129 supported on a bracket 130 which in turn is secured to the slidable plate 101. A flexible belt 131 connects the pulley of the motor with the pulley 132 splined on the spindle. The arrangement is such that the pulley 132 does not move axially although the spindle does so move upon actuation of piston 124.

Figure 3:
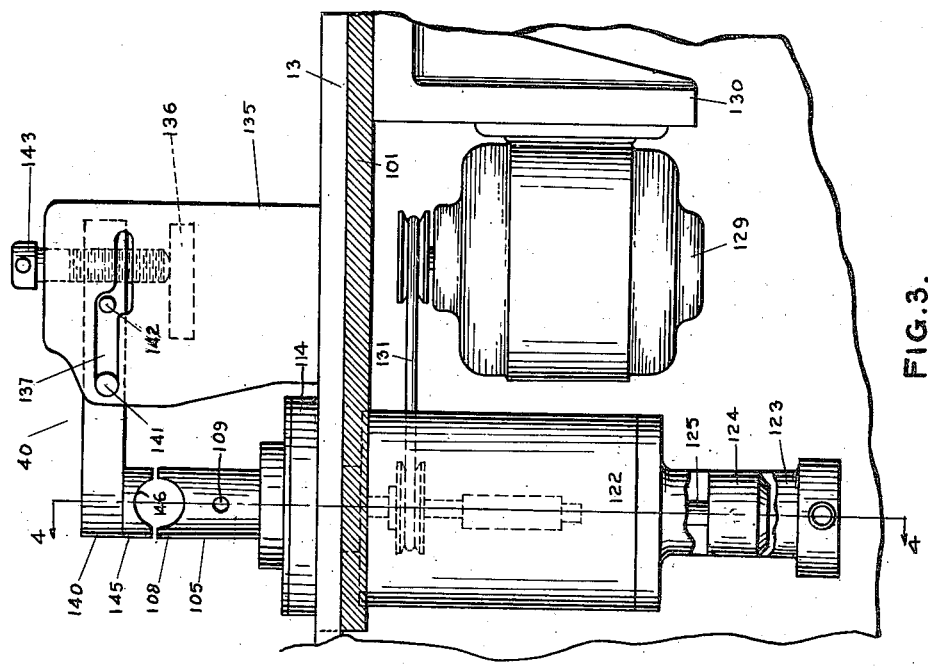
Figure 3 is a side view of the tube clamping and drilling arrangement.
Figure 4:
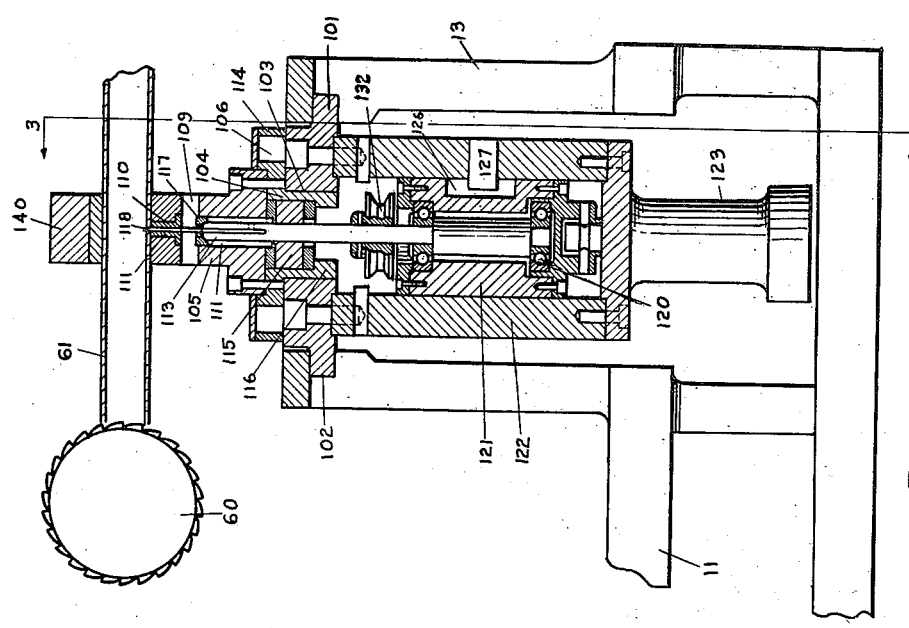
Figure 4 is a cross-section taken along the line 4—4 of Figure 3 and showing the clamped tube in relation to a milling cutter.

To provide quickly operable means to clamp the tubes on the support 102, a pair of spaced parallel plates 135 connected together by a heavy strut 136 and provided with laterally aligned stepped slots 137 are securely fastened to the plate 101. A bar 140 positioned between said plates and extending therebeyond to overlie the support 105 is pivotably mounted on the hinge pin 141 the ends of which are longitudinally slidable in the upper portion of the slots 137. A second smaller pin 142 is passed through bar 140 and its ends are received and longitudinally slidable in the lower portion of the slot 137 and in the center portion connecting the upper and lower portions. When the bar 140 is in its outer position, as shown in Figure 3, the bar may pivot about pin 141 to bring the outer end thereof toward the support 105, the smaller pin 142 being movable vertically in the center portion of the slots to allow this pivotal movement. The end opposite the tube engaging end of the bar 140 is provided with a threaded bore to receive the threaded bolt 143, the lower end of which is rounded to engage the strut 136. As bolt 143 is rotated, an expansive force is applied between strut 136 and the overlying end of the bar 140 causing the bar to rotate about pin 141 and apply a clamping force to the tube. When the bolt 143 is loosened sufficiently the bar 140 may be moved away from the support 105 to facilitate the removal and insertion of the tubes. The outer end of bar 140 is provided with a depending member 145 having a semi-cylindrical lower surface 146 to engage the tubes and is preferably rotatably mounted on the bar so that it may be oriented along with the swivel support 105.

In operation, the machine having been properly set up, a preformed tube 61 is placed in the clamps 40 and the rotating milling cutters are moved toward each other and into engagement with the ends of the tubes to provide the ends with the proper surfaces. At the same time the rotating drills 118 are moved upwardly by the pistons 124 to drill the indexing apertures in the tubes. This simultaneous operation is accomplished by coupling the hydraulic feed line 150 leading to the left of the piston in cylinder 32 with the hydraulic feed line 149 leading to the lower part of cylinder 123. A source of fluid pressure is provided at 147 for delivery to the reversing valve 148 and a discharge 154 leads to a reservoir. Another set of tubes 151 and 152 leads to the opposite ends of pistons 32 and 123 to return the drill 118 and slide 30 to their original positions upon completion of the milling and drilling operations. A valve 156 fixed on the slide carrier 26 (Figure 1) is adapted to be actuated by the adjustable trip 155 mounted on slide 30 to reverse the valve 148 and move slide 30 and drill 118 to their original positions upon completion of the work. No attempt has been made to show the hydraulic feed mechanism in detail since such systems are well known in the art and they are readily procurable as complete systems in the open market.

Movable supports 11 and 12 provide for varying lengths of tubes being milled and the transversely movable blocks 22, the pivotally mounted slide carriers 26, the pivotally mounted brackets 32, and the pivotally mounted supports 57 provide an infinite number of adjustments for the milling cutters 60 so that they may be set up to mill substantially any desired shape on the ends of the tubes applied to the machine. Inasmuch as the axes of rotation of the sleeves 39 carrying the brackets 42 are parallel with the direction of movement of the slides 30 on members 26, the milling cutters are moved, in operation, along the axes of the sleeves which axes may be made coincident with the center line of adjacent ends of the tubes by transverse adjustment of blocks 22, angular adjustment of members 26, and transverse and angular adjustments of the tube clamps 40. All adjustable members are preferrably provided with means to indicate their finally selected position so as to facilitate the setting up of the machine in a subsequent recurrent similar use of the machine.

Figure 7:
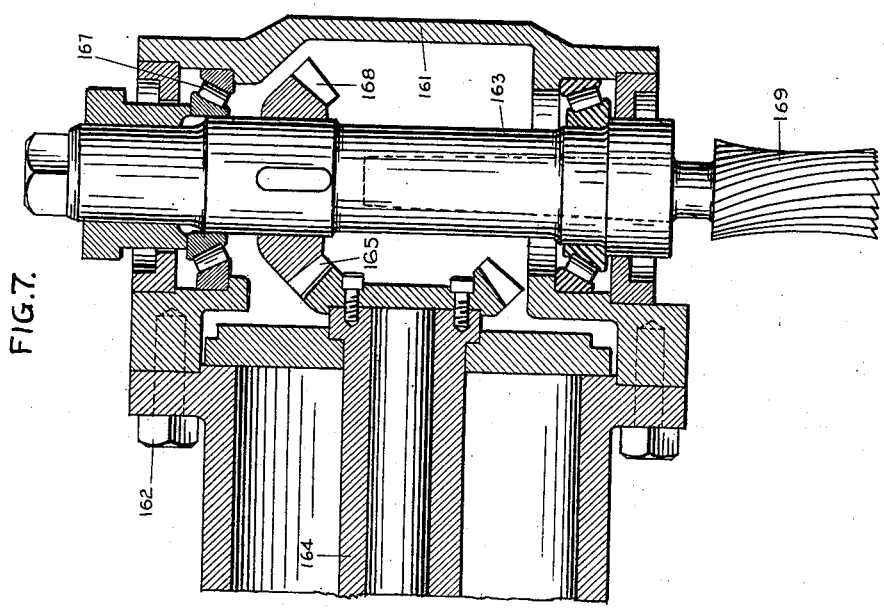
Figure 7 is an enlarged sectional view of the modified cutter support of Figure 6.
Figure 6:
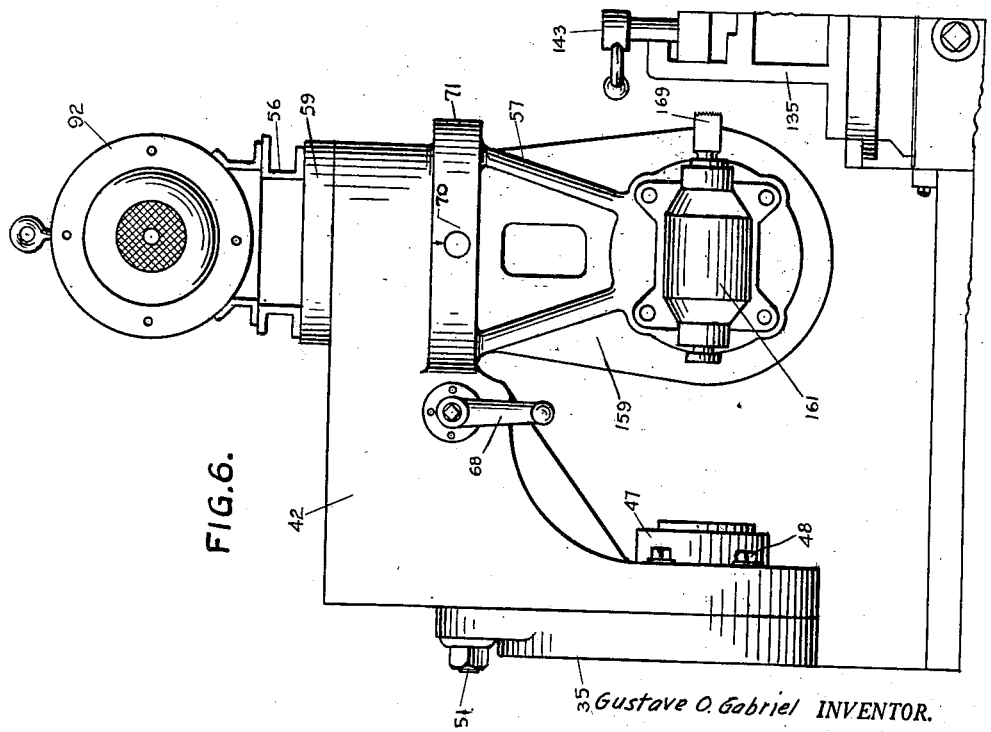
Figure 6 is an assembled view of a modified means for mounting a milling cutter.

In certain operations it may be desirable to provide the tube with end surfaces which cannot be generated by peripheral cutters but which can be accomplished by providing the cutting edges on the free ends of the cutters and moving the cutters generally along their axes of rotation. The machine above described is incapable of so mounting the cutters since there are a considerable number of degrees which cannot be traversed by pivotal movement of the carriers 57 about pins 64. The pivotal movement is limited by the driving chains and guards 159 which move against the brackets 42. To obviate this difficulty I provide the attachment shown in Figures 6 and 7 which consists essentially of a housing 161 secured by bolts 162 to the lower portion of spindle carrier 57 and supporting the cutter carrying spindle 163 positioned at right angles to the normal axis of rotation of the cutter. A shaft 164, driven in the same manner as is the spindle 81 of Figure 5, extends through the hub of the carrier 57 and has a bevel gear 165 attached at its driving end. Spindle 163 is mounted in the housing 161 on anti-friction bearings 167 and has keyed thereon a bevel gear 168 which is adapted to mesh with and be driven by the bevel gear 165. As illustrated in Figure 6, the axis of rotation of the end face cutter 169 carried by spindle 163 may be oriented into the horizontal axis of rotation of the bracket 42 so that the cutter may be fed axially toward the end of the tube to be milled.

It is thus made apparent that I have provided a machine for the rapid production of drilled and end milled members in which the milled surfaces may be of a wide variety of shapes and angular dispositions and in which all the operations are accomplished with inherent accuracy once the machine is properly adjusted. Inasmuch as milling cutters and other tools of varying kinds and shapes must be employed to produce the various surfaces, the invention is not to be limited to any particular character of cutting tools.

My invention is obviously capable of being embodied in other forms of apparatus than that specifically illustrated and described. For example, it is readily conceivable that the drilling units may be mounted horizontally above the slides 101 without sacrificing any of the principles or advantages of the production system involved. Other rearrangements and substitutions, equivalent mechanically and functionally, may be made without departing from the scope of the invention.

What I claim is:

1. In a machine of the character described, the combination of a base, means on said base for the support of a tube, fitting, or other element to be operated upon, a pair of rotatable cutters mounted on said base in operative relation to the ends of said tube, fitting or other element, each of said cutters being adjustable about a plurality of intersecting axes, the points of intersection coinciding with the geometrical centers of said cutters, and means to move said cutters longitudinally along certain of said axes into engagement with the ends of said tube, fitting, or other element.

2. In a machine of the character described, the combination of a base, means on said base for the support of a tube, fitting, or other element to be operated upon, a pair of rotatable cutters mounted on said base in operative relation to the ends of said tube, fitting, or other element, each of said cutters being adjustable about a plurality of angularly related axes, and means to move said cutters longitudinally along axes angularly related to the axes of rotation of said cutters and into engagement with the ends of said tube, fitting, or other element.

3. In a machine of the character described, the combination of a base, means on said base for the support of a tube, fitting, or other element to be operated upon, a pair of rotatable members having cutting edges on their peripheral surfaces mounted on said base in operative relation to the ends of said tube, fitting, or other element, means to move said member longitudinally along axes angularly related to the axes of rotation of said cutters into engagement with the ends of said tube, fitting, or other element.

4. In a machine of the character described, the combination of a base, means on said base for the support of a tube, fitting or other element to be operated upon, a pair of rotatable members having cutting edges on their peripheral surfaces mounted on said base in operative relation to the ends of said tube, fitting, or other element, means to move said members longitudinally along axes angularly related to the axes of rotation of said cutters into engagement with the ends of said tube, fitting, or other element, and means to vary the angularities between the said axes of movement and the said axes of rotation of the rotatable members.

5. In a machine of the character described, the combination of a base, a pair of spaced clamping assemblies on said base adapted to support and secure a tube, fitting, or other element to be operated upon, said assemblies being transversely and rotatably adjustable with respect to said base whereby tubes, fittings or other elements of varying curvatures may be immovably held on said base, a pair of rotatable cutters mounted on said base in operative relation to the ends of the tube, fitting or other element secured in said clamping assemblies, a rotatable transversely movable member between each of said cutters and said base, said cutters being carried by slides on said members, and means to move said slides relative to said members whereby said cutters may be moved into engagement with the ends of said tube, fitting, or other element along the center lines of the end portions of said tube, fitting, or other element.

6. In a machine of the character described, the combination with means to support and secure a tube, fitting or other element of varying curvature, of means to generate surfaces of varying shapes and angular dispositions on the ends of said tube, fitting, or other element, said last mentioned means comprising rotating milling cutters rotatably adjustable about a plurality of angularly disposed axes, means to move certain of said axes laterally with respect to said tube, fitting, or other element, means to change the angular relationship between said certain axes and said tube, fitting or other element, and means to move said cutters along said certain axes into engagement with the ends of said tube, fitting or other element.

7. In a machine of the character described, the combination with means to support and secure a tube, fitting or other element of varying curvature to be operated upon, of means to generate desired surfaces on the ends of said tube, fitting or other element, said last mentioned means comprising motor driven metal cutting tools mounted adjacent opposed ends of the member to be operated upon, means to feed said tools in straight lines toward said ends, and means to alter the direction and position of said lines of feed whereby said tools may move along the center lines of the end portions of said member being operated upon.

8. In a machine of the character described, the combination of a base, a pair of spaced clamping assemblies on said base adapted to support and secure a tube, fitting or other element being operated upon, said assemblies being transversely and rotatably adjustable with respect to said base whereby tubes, fittings or other elements of varying curvatures may be immovably held on said base, means to generate surfaces of varying shapes and angular dispositions on the ends of said tube, fitting, or other element comprising a pair of motor driven cutters mounted on said base in operative relation to the said ends, a drilling assembly connected with each of said clamping assemblies and being operative to provide indexing bores in said tube, fitting, or other element adjacent the ends thereof in predetermined relation to adjacent generated end surfaces thereof.

9. In a machine of the character described, the combination with a base, of adjustable clamping means on said base to support and secure a member to be operated upon, means to generate surfaces of varying shapes and angular dispositions on the ends of said member comprising motor driven cutters mounted on said base and movable axially of said member, means to limit the extent of such movement, and means attached to said clamping means to provide said member with indexing bores adjacent the ends thereof in predetermined relation to the generated end surfaces, said last mentioned means and said cutters being movable into said member simultaneously.

10. The method of preparing a structural member for subsequent fabrication with the aid of assembling jigs which consists of simultaneously generating the required end surfaces of said member by means engaging said end surfaces and movable toward each other, limiting the inward movement of said means, and simultaneously providing said member with jig indexing bores bearing a fixed predetermined relation to the inner limiting positions of said means.

11. The method of fabrication which consists of preparing a structural member of the finished article by simultaneously drilling indexing bores and generating required end surfaces thereon in predetermined relation to each other, placing said member in a jig provided with means to engage said bores so as to properly position and orient said member in relation to other members to which it is to be attached, and securing said member to said other members.

12. The method of fabricating articles of tubular members which consists of preparing said tubular members by simultaneously drilling indexing apertures in the side walls of said members and generating required end surfaces thereon in predetermined relation to each other and to the apertures, placing said members in a jig provided with means to engage said apertures to properly position and orient said members in relation to each other, and welding said members together.

13. The method of preparing tubular members having angularly disposed curved end surfaces for further fabrication which consists of simultaneously generating the required curved end surfaces on said member by means engaging opposite ends of said member and movable toward each other, and automatically limiting the inward travel of said means whereby the distance between said surfaces is predeterminedly controlled.

14. Apparatus of the class described comprising a horizontal base, a pair of supports longitudinally slidable on said base, a block transversely slidable on each of said supports, a slide carrier pivotally mounted on each of said blocks, a slide on each of said carriers, means on said carriers to move said slides, a bracket pivotally mounted on each of said slides, a motor driven tool carrying spindle pivotally mounted on each of said brackets and rotatable about axes angularly related to the axes of rotation of the spindles, and means on said base to support a member to be operated upon in operative relation to said spindles.

15. Apparatus of the class described comprising a base, a slide, means mounting said slide on said base for linear and angular adjustment, an L-shaped bracket pivotally mounted on said slide with the vertical portion thereof in contact with a portion of said slide, a horizontal pivot connecting said bracket and slide, a spindle support depending from the outer end of the horizontal portion of said bracket, a motor support above said bracket opposite said spindle support, means interconnecting said spindle and motor supports for simultaneous pivotal movement relative to said bracket about common axes, a spindle carried by said spindle support, a motor carried by said motor support, and overhanging driving means connecting said spindle and motor, said driving means being spaced from said bracket.

16. Apparatus of the class described comprising a base, a bracket mounted on said base for pivotal movement about an axis, an offset spindle support mounted on said bracket for pivotal movement about an axis intersecting said first mentioned axis, a spindle carried by said offset support for rotation about an axis angularly related to said first mentioned axes, and a metal cutting tool carried by said spindle and having its geometrical center substantially at the point of intersection of said first mentioned axes.

17. Apparatus of the class described comprising a base, a bracket mounted on said base for pivotal movement about an axis, an offset spindle support pivotally and dependently mounted on said bracket for movement about an axis intersecting said first mentioned axis, a motor positioned above said bracket and interconnected with said spindle support for simultaneous movement with said spindle support about common axes, a drive shaft rotatably carried by said spindle support, said shaft being parallel with the motor shaft, overhanging driving means interconnecting said shafts, said driving means being spaced from said bracket, a spindle carried by said spindle support and extending at right angles to said drive shaft, a metal cutting tool carried by said spindle and power transmission means between said drive shaft and said spindle, said spindle being rotatable about said first mentioned axis.

18. Apparatus of the class described comprising a base, a member having a horizontally disposed portion extending above said base, an offset spindle supporting bracket secured to and depending from said member, a drive shaft rotatably supported by said bracket and extending horizontally beyond said member, a motor supported above said member and being provided with a shaft parallel with said drive shaft, driving means spaced from said member connecting said shafts, a tool carrying spindle supported by said bracket, said spindle extending at an angle to said drive shaft, and power transmission means between said drive shaft and spindle.

19. Apparatus of the class described comprising a supporting member having parallel upper and lower surfaces, a centrally positioned bore through said member, a plurality of radially positioned bores through said member, a motor support including a disk adapted to engage one of said surfaces, a spindle support including a disk adapted to engage the other of said surfaces, arcuate slots in said first mentioned disk, arcuate T-shaped slots in said second mentioned disk, a pivot bolt passing through said disks and said centrally positioned bore and keyed to each of said disks, other bolts having their heads positioned in T-shaped slots, said other bolts passing through said radially positioned bores and said arcuate slots in said first mentioned disk, clamping nuts screw-threaded onto said bolts above said first mentioned disk, and means to rotate said assembly comprising a worm wheel encircling and secured to one of said disks.

20. Apparatus of the class described comprising a base, means on said base to support and secure an element to be operated upon, said means including a pair of supports having parallel transversely extending guideways therein, a slide on each of said supports partially positioned within said guideways, a rotatable support on each of said slides, a member carried by each slide operable to clamp said element to said supports, said members being provided with pivotally attached caps to engage the element.

21. Apparatus of the class described comprising a base, means on said base to support and secure an element to be operated upon, said means including a transversely movable slide, a rotatable support carried above said slide, a member carried by the slide and operable to clamp said element to said support, a drill carrying spindle supported by said slide, a drill carried by said spindle and extending through an aperture in said support to engage said element, a motor carried by said slide and driving said spindle, and means to move said spindle and drill toward said element.

22. Apparatus for forming a predetermined curvature in the end surface of an elongated structural member comprising a base, means carried by said base and adjustable about a vertical axis to clamp said member adjacent its end, a frame pivotally mounted on said base for movement about a vertical axis, a slide carried by said frame, a milling cutter carried by said slide, means to drive said cutter, and means to move said slide relative to said frame.

23. Apparatus according to claim 22 further characterized by the inclusion of means associated with said clamp to provide said member with an indexing formation while the end surface of said member is being cut.

GUSTAVE O. GABRIEL.